(12) United States Patent
Oseto et al.

(10) Patent No.: US 7,854,673 B2
(45) Date of Patent: Dec. 21, 2010

(54) BICYCLE SPROCKET ASSEMBLY HAVING A REINFORCEMENT MEMBER COUPLED BETWEEN SPROCKETS

(75) Inventors: Shinya Oseto, Osaka (JP); Kentaro Hiratani, Osaka (JP)

(73) Assignee: Shimano Inc., Osaka (JP)

( * ) Notice: Subject to any disclaimer, the term of this patent is extended or adjusted under 35 U.S.C. 154(b) by 421 days.

(21) Appl. No.: 11/513,350

(22) Filed: Aug. 31, 2006

(65) Prior Publication Data

US 2008/0058144 A1 Mar. 6, 2008

(51) Int. Cl.
*F16H 9/00* (2006.01)
*F16D 1/00* (2006.01)

(52) U.S. Cl. .................. 474/82; 474/160; 474/152; 403/353

(58) Field of Classification Search ............... 474/82
See application file for complete search history.

(56) References Cited

U.S. PATENT DOCUMENTS

| | | | |
|---|---|---|---|
| 2,710,436 A * | 6/1955 | Davis | 24/68 CD |
| 3,815,149 A * | 6/1974 | Ishihara | 396/383 |
| 3,919,898 A * | 11/1975 | Sugino | 74/594.2 |
| 4,043,215 A * | 8/1977 | Long et al. | 474/218 |
| 4,124,107 A | 11/1978 | Kine | |
| 4,230,212 A | 10/1980 | Tsuchie et al. | |
| 4,278,265 A | 7/1981 | Nagano | |
| 4,296,850 A | 10/1981 | Isobe | |
| 4,311,473 A * | 1/1982 | Sugimoto | 474/160 |
| 5,194,051 A | 3/1993 | Nagano | |
| 5,935,034 A | 8/1999 | Campagnolo | |
| 5,954,604 A | 9/1999 | Nakamura | |
| 6,102,821 A | 8/2000 | Nakamura | |
| 6,176,798 B1 | 1/2001 | Nakamura | |
| 6,340,338 B1 | 1/2002 | Kamada | |
| 6,382,381 B1 | 5/2002 | Okajima | |
| 2004/0070166 A1 | 4/2004 | Valle | |
| 2004/0093020 A1 * | 5/2004 | Sinton | 606/208 |
| 2004/0121867 A1 | 6/2004 | Reiter | |
| 2005/0272546 A1 | 12/2005 | Reiter | |
| 2006/0085968 A1 * | 4/2006 | Yamaguchi et al. | 29/527.5 |

FOREIGN PATENT DOCUMENTS

| | | |
|---|---|---|
| DE | 26 31 264 | 1/1977 |
| DE | 26-52-426 | 5/1977 |
| DE | 29 15 181 | 10/1979 |

(Continued)

*Primary Examiner*—Bradley T King
*Assistant Examiner*—Mahbubur Rashid
(74) *Attorney, Agent, or Firm*—Global IP Counselors, LLP (57) ABSTRACT

A bicycle sprocket assembly includes a first sprocket, a second sprocket and at least one reinforcement member. The first sprocket includes a first main body and a first chain engagement portion. The second sprocket includes a second main body and a second chain engagement portion. The reinforcement member is coupled between the sprockets. Preferably, the reinforcement member is disposed in first and second apertures of the first and second sprockets at a radial location spaced radially outwardly of first and second inner end portions of the first and second sprockets. Preferably, a spacer is disposed between the first and second sprockets radially inwardly of the reinforcement member. The reinforcement member is preferably installable in the first and second apertures by a sliding movement generally perpendicular to a rotation axis of the first and second sprockets.

24 Claims, 10 Drawing Sheets

FOREIGN PATENT DOCUMENTS

| | | |
|---|---|---|
| DE | 103 42 638 A1 | 4/2005 |
| EP | 0 012 568 A1 | 6/1980 |
| EP | 1 074 462 A2 | 2/2001 |
| EP | 1 688 345 A2 | 8/2006 |
| EP | 1 764 296 A1 | 3/2007 |
| GB | 1 555 532 | 11/1979 |
| JP | 59-165293 U | 11/1984 |

\* cited by examiner

BICYCLE SPROCKET ASSEMBLY HAVING A REINFORCEMENT MEMBER COUPLED BETWEEN SPROCKETS

BACKGROUND OF THE INVENTION

1. Field of the Invention

This invention generally relates to a bicycle sprocket assembly. More specifically, the present invention relates to a bicycle sprocket assembly utilizing a reinforcement member coupled between at least two sprockets.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle to meet the demands of riders. In particular, in recent years, the bicycle drive train has been designed to provide an increased number of speeds or gear ratios as well as smoother and more user friendly shifting performance. Moreover, most bicycle components are also being improved to be lighter in weight.

Increasing the number of speeds typically requires increasing the number of sprockets installed on the rear-wheel sprocket assembly. As a result of the increased number of rear sprockets, the weight of the rear sprocket assembly may also increase. Moreover, sometimes the increased number of rear sprockets may be designed to fit in the space designed for a smaller number of rear sprockets. Thus, as a result of the increased number of rear sprockets, it may be necessary and/or desirable to make the rear sprockets relatively thin for compatibility reasons and/or for weight reduction.

Shifting performance of these typical rear sprocket assemblies may not be optimal due to flexing movement of some of the rear sprockets (the larger sprockets in particular). On the other hand, if designed to provide optimal shifting performance, these typical rear sprocket assemblies may be heavier than desired by some riders. In either case, these sprocket assemblies may be relatively difficult and/or complicated to manufacture and/or assemble. In recent years, rear sprocket assemblies have been designed that offer good shifting performance, and which are relatively lightweight. These sprocket assemblies typically utilize one or more sprocket carriers with sprocket portions mounted thereto. The sprocket portions and the one or more carriers are often constructed of different materials using different methods, and must comply with tight tolerances. While these sprocket assemblies generally work well, these rear sprocket assemblies can be cumbersome to assemble and/or can be relatively complicated and expensive to manufacture.

In view of the above, it will be apparent to those skilled in the art from this disclosure that there exists a need for an improved bicycle sprocket assembly. This invention addresses this need in the art as well as other needs, which will become apparent to those skilled in the art from this disclosure.

SUMMARY OF THE INVENTION

One object of the present invention is to provide a bicycle sprocket assembly, which facilitates smooth shifting of a chain between the various sprockets thereof.

Another object of the present invention is to provide a bicycle sprocket assembly, which is relatively strong yet lightweight.

Yet another object of the present invention is to provide a bicycle sprocket assembly, which is relatively simple and inexpensive to manufacture and assemble.

The foregoing objects can basically be attained by providing a bicycle sprocket assembly, which includes a first sprocket, a second sprocket, a spacer and at least one reinforcement member. The first sprocket includes a first main body with a first inner end portion configured to be attached to a bicycle freewheel and a first outer chain engagement portion. The second sprocket includes a second main body with a second inner end portion configured to be attached to the bicycle freewheel and a second outer chain engagement portion. The spacer is disposed between the first and second sprockets at a radial location adjacent the first and second inner end portions. The reinforcement member is coupled between the first and second sprockets at a radial location spaced radially outwardly of the first and second inner end portions.

The foregoing objects can also basically be attained by providing a bicycle sprocket assembly, which includes a first sprocket, a second sprocket and at least one reinforcement member. The first sprocket includes a first main body with at least one first aperture and a first outer chain engagement portion. The second sprocket includes a second main body with at least one second aperture and a second outer chain engagement portion. The reinforcement member is disposed in the first and second apertures of the first and second sprockets, respectively. Each of the first and second apertures includes a first section and a second section narrower than the first section to assemble the reinforcement member with the first and second sprockets. The reinforcement member is retained in the second sections when assembled.

The foregoing objects can also basically be attained by providing a bicycle sprocket assembly, which includes a first sprocket, a second sprocket and at least one reinforcement member. The first sprocket includes a first main body with a first outer chain engagement portion and at least one first aperture. The second sprocket includes a second main body with a second outer chain engagement portion and at least one second aperture. The reinforcement member is disposed in the first and second apertures of the first and sprockets, respectively. The reinforcement member has three abutment portions with two sprocket receiving portions arranged therebetween in an alternating manner. The reinforcement member is installable in the first and second apertures by a sliding movement generally perpendicular to a rotation axis of the first and second sprockets.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
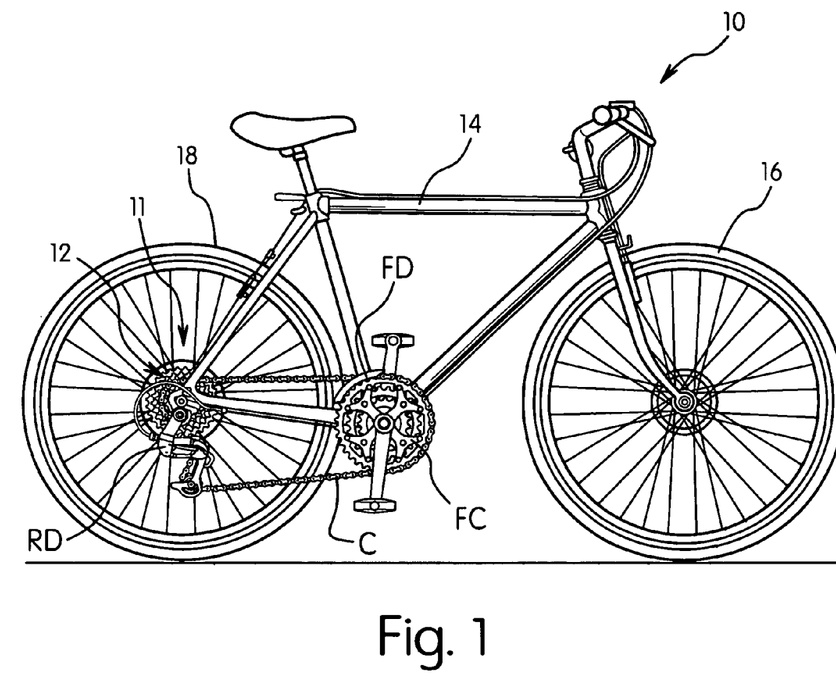
FIG. 1 is a side elevational view of a bicycle having a rear hub with a rear sprocket assembly in accordance with a first embodiment of the present invention.
Figure 2:
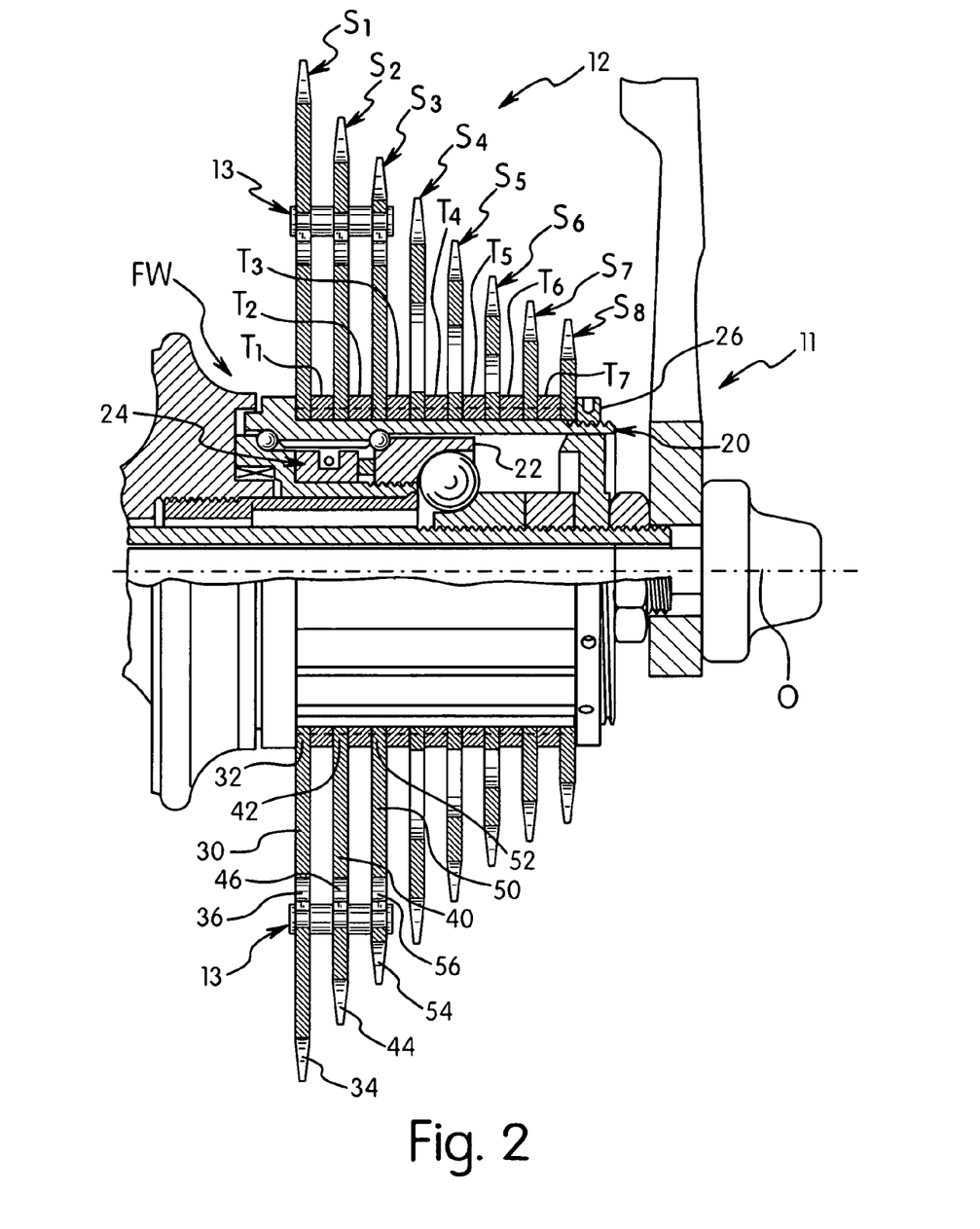
FIG. 2 is an enlarged, cross-sectional view of the rear hub and sprocket assembly of the bicycle illustrated in FIG. 1.

Referring initially to FIGS. 1-2, a bicycle 10 having a rear bicycle hub 11 with a rear multi-stage sprocket assembly 12 in accordance with a first embodiment of the present invention is illustrated. The rear sprocket assembly 12 preferably includes first, second and third sprockets $S_1$, $S_2$ and $S_3$ (i.e., the three largest rear sprockets) that are coupled together with a plurality of reinforcement members 13 in accordance with the present invention, as well as conventional fourth-eighth sprockets $S_4$-$S_8$, as discussed below. In particular, the first, second and third sprockets $S_1$, $S_2$ and $S_3$ are releasably attached together with the reinforcement members 13. However, the reinforcement members 13 are normally retained with the first, second and third sprockets $S_1$, $S_2$ and $S_3$ during normal use in accordance with the present invention, as explained below. The first-eighth sprockets $S_1$-$S_8$ are preferably mounted on a freewheel FW of the rear hub 11 using a splined connection in a relatively conventional manner.

The bicycle 10 is conventional, except for the rear sprocket assembly 12. Thus, the bicycle 10 will not be discussed and/or illustrated in detail herein, except as related to the rear sprocket assembly 12. The bicycle 10 basically includes a frame 14 with front and rear wheels 16 and 18 coupled to the frame 14 in a conventional manner, conventional drive train components such as a front crank set FC, a front derailleur FD, a rear derailleur RD and a chain C coupled to the frame 14 in a conventional manner, as well as other conventional bicycle components (e.g. shift control devices, braking devices, shift/brake cables, seat, handlebar, pedals, etc.). These conventional parts or components of the bicycle 10 will not be explained and/or illustrated in detail herein except as related to the present invention.

As mentioned above, the rear sprocket assembly 12 is preferably coupled to the rear hub 11 via the freewheel FW. Specifically, the freewheel FW includes a conventional splined outer tubular member 20, an inner tubular member 22 and a one-way clutch 24 disposed between the outer tubular member 20 and the inner tubular member 22 in a conventional manner. The inner tubular member is non-rotatably coupled to the hub shell of the rear hub 11 in a conventional manner. The outer tubular member 20 is basically conventional. Thus, the outer tubular member 20 includes an annular abutment shoulder with a plurality of axially extending splines extending therefrom and an externally threaded free end configured and arranged to threadedly receive a locking ring 26 thereon in a conventional manner.

Referring now to FIGS. 2-12, the rear sprocket assembly 12 in accordance with the first embodiment of the present invention will now be explained in more detail. In the illustrated embodiment, the rear sprocket assembly 12 is an eight-stage sprocket assembly with sprockets $S_1$-$S_8$ being spaced from each other at predetermined intervals using a plurality of (seven) spacers $T_1$-$T_7$ disposed in an alternating manner therebetween. The sprockets $S_1$-$S_8$ are retained on the splined outer tubular member 20 using the locking ring 26 that is threadedly mounted on the free end of the outer tubular member 20 in a conventional manner. Thus, the sprockets $S_1$-$S_8$ are fixedly mounted on the freewheel FW of the rear hub 11 in a relatively conventional manner such that the sprockets $S_1$-$S_8$ rotate together about a center hub rotation axis O. The sprockets $S_1$-$S_8$ typically rotate together in a forward rotational direction (e.g., in a clockwise direction as viewed in FIG. 1) when the rider is pedaling in a forward (clockwise) direction to propel the bicycle 10 in a forward direction as seen in FIG. 1.

Thus, the multi-stage sprocket assembly 12 is adapted to engage with the drive chain C, which is a conventional style bicycle chain as seen in FIG. 1. The drive chain C is a continuous loop that has a plurality of inner link plates and a plurality of outer link plates that are pivotally connected to each other by articulation pins and rollers. During a chain shifting process, the chain C is shifted from one of the sprocket $S_1$-$S_8$ to the next adjacent sprocket $S_1$-$S_8$ by the rear derailleur RD moving the chain C in an axial direction relative to the axis of rotation O of the sprockets $S_1$-$S_8$ in a conventional manner.

It will be apparent to those skilled in the bicycle art from this disclosure that a sprocket assembly in accordance with the present invention can have fewer or more sprockets than illustrated herein. Moreover, it will be apparent to those skilled in the bicycle art from this disclosure that the principles of the present invention can be applied to other sprockets of a sprocket assembly, (i.e., not just to the largest three sprockets) and/or can be applied to fewer than three sprockets (i.e., two sprockets) if needed and/or desired. In other words, the present invention can be any multi-stage sprocket assembly for a bicycle that uses a derailleur or the like and which includes at least one relatively larger sprocket and at least one relatively smaller sprocket.

In any case, in the illustrated embodiment, the sprockets $S_4$-$S_8$ are conventional, while the sprockets $S_1$, $S_2$ and $S_3$ include the reinforcement members 13 coupled therebetween in accordance with the present invention. Accordingly, the sprockets $S_4$-$S_8$ will not be discussed and/or illustrated in detail herein, except as related to the sprocket $S_1$, $S_2$ and $S_3$ of the present invention. In the illustrated embodiment, the sprocket $S_1$ can be considered a first sprocket, the sprocket $S_2$ can be considered a second sprocket and the sprocket $S_3$ can be considered a third sprocket. Of course, it will be apparent to those skilled in the bicycle art from this disclosure that the principles of the present invention can be applied between merely two sprockets, or more than three sprockets (e.g., four sprockets) if needed and/or desired even though connections between three sprockets are illustrated herein.

Referring to FIGS. 2-5 and 12, the first sprocket $S_1$ basically includes a first main body 30, a first inner peripheral end portion 32, a first outer chain engagement portion 34, and a plurality of first apertures 36 formed in the first main body 30. The first apertures 36 are configured and arranged to have the reinforcement members 13 mounted therein, as explained below. The first main body 30, the first inner peripheral end portion 32 and the first outer chain engagement portion 34 are preferably integrally formed together as a one-piece, unitary member using conventional manufacturing techniques that are well known in the bicycle art. Specifically, the first sprocket $S_1$ is preferably constructed of a light weight, rigid material such as a conventional metallic material using conventional manufacturing techniques (e.g., casting, machining, punching or the like) in a conventional manner.

Figures 10, 11, 12:
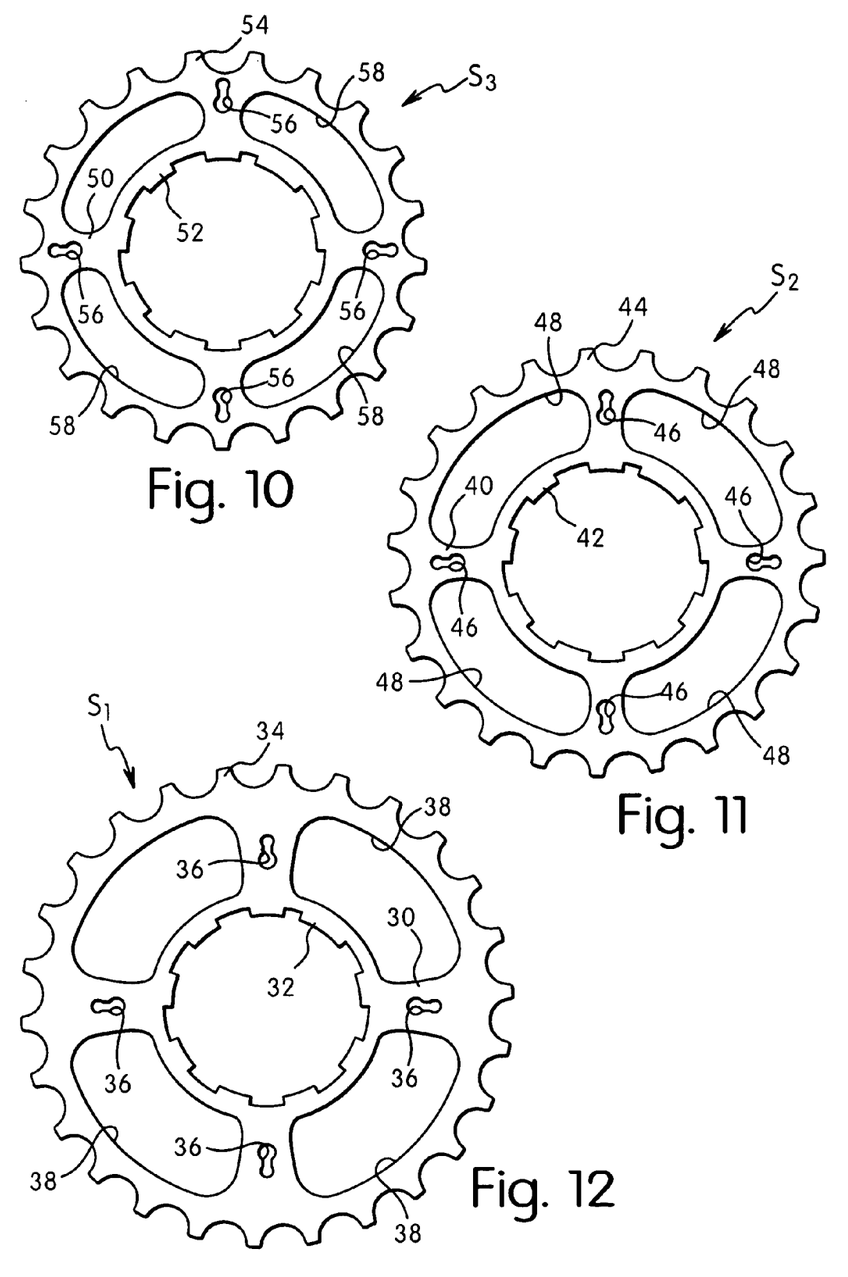
FIG. 10 is a side elevational view of the third largest sprocket illustrated in FIGS. 3-5.
FIG. 11 is a side elevational view of the second largest sprocket illustrated in FIGS. 3-5.
FIG. 12 is a side elevational view of the largest sprocket illustrated in FIGS. 3-5.
Figure 13:
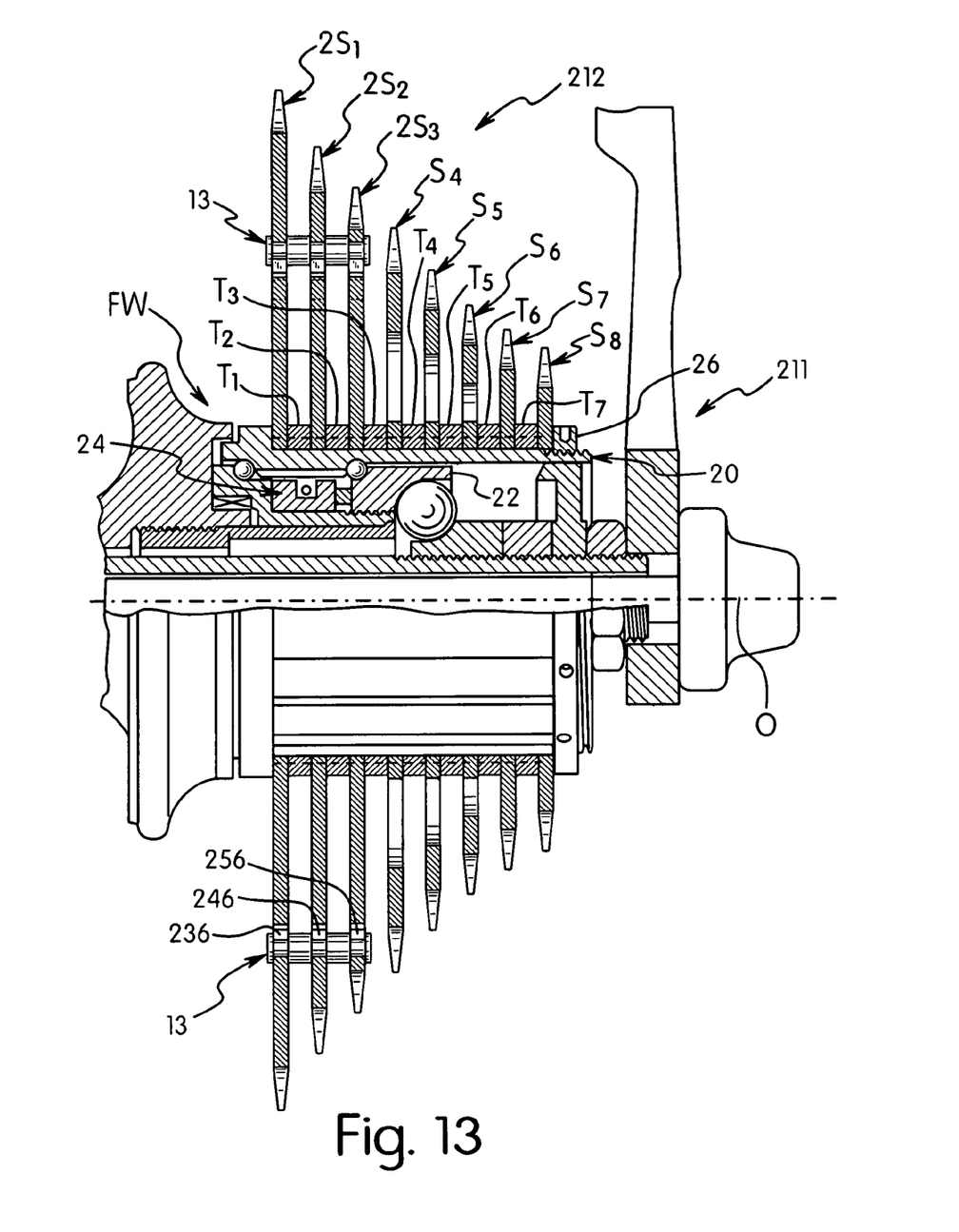
FIG. 13 is an enlarged, cross-sectional view of the rear hub illustrated in FIGS. 1-2 but with a sprocket assembly mounted thereon in accordance with a second embodiment of the present invention.

The first main body 30 is basically a flat annular plate-shaped element having the first apertures 36 formed therein as well as a plurality of cutouts 38 formed therein. The first apertures 36 are preferably circumferentially spaced about the first main body 30 in an alternating manner between the cutouts 38. Preferably, the first apertures 36 are circumferentially equally spaced from each other. In the illustrated embodiment, the first main body 30 includes four first apertures 36 configured and arranged to receive four reinforcement members 13 therein. However, it will be apparent to those skilled in the bicycle art from this disclosure that more/fewer first apertures 36 and reinforcement members 13 can be used without departing from the scope of the present invention.

The first inner peripheral end portion 32 is basically an annular plate-shaped element that has a splined inner peripheral surface configured to mate with the splined outer tubular member 20 in a conventional manner. The first outer chain engagement portion 34 is basically an annular plate-shaped element that has a plurality of chain engagement teeth defining an outer peripheral surface, which are configured to mate with the drive chain C in a conventional manner. Thus, the first inner end portion 32 is disposed at the radially inner periphery of the first main body 30, while the first chain engagement portion 34 is disposed at the radially outer periphery of the first main body 30.

Referring to FIGS. 2-5 and 9-11, the second and third sprockets $S_2$ and $S_3$ will now be explained in more detail. The second and third sprockets $S_2$ and $S_3$ are basically identical to the first sprocket $S_1$, except they have fewer teeth, and thus, have smaller external diameters. Accordingly, the second sprocket $S_2$ basically includes a second main body 40, a second inner peripheral end portion 42, a second outer chain engagement portion 44, and a plurality of second apertures 46 formed in the second main body 40. Similarly, the third sprocket $S_3$ basically includes a third main body 50, a third inner peripheral end portion 52, a third outer chain engagement portion 54, and a plurality of third apertures 56 formed in the third main body 50. The second sprocket $S_2$ is larger than the third sprocket $S_3$ but smaller than the first sprocket $S_1$.

The second and third apertures 46 and 56 are configured and arranged to have the reinforcement members 13 mounted therein, as explained below. The second and third apertures 46 and 56 are aligned with the first apertures 36 when the sprockets $S_1$, $S_2$ and $S_3$ are mounted on the splined outer tubular member 20 of the freewheel FW due to the configuration of the splines, as best understood from FIGS. 2-5 and 10-12. The second and third sprockets $S_2$ and $S_3$ are preferably constructed using techniques/materials identical to the first sprocket $S_1$.

The second main body 40 is basically a flat annular plate-shaped element having the second apertures 46 formed therein as well as a plurality of cutouts 48 formed therein, while the third main body 50 is also basically a flat annular plate-shaped element having the third apertures 56 formed therein as well as a plurality of cutouts 58 formed therein. The second and third apertures 46 and 56 are preferably circumferentially spaced about the second and third main bodies 40 and 50 in an alternating manner between the cutouts 48 and 58, respectively. In the illustrated embodiment, the second main body 40 includes four second apertures 46 and the third main body 50 includes four of the apertures 56. However, it will be apparent to those skilled in the bicycle art from this disclosure that more/fewer second and third apertures 46 and 56 and reinforcement members 13 can be used without departing from the scope of the present invention. In any case, the number of apertures 36, 46 and 56 preferably correspond to the number of reinforcement members 13 utilized.

The second and third inner peripheral end portions 42 and 52 are basically annular plate-shaped elements that have splined inner peripheral surfaces configured to mate with the splined outer tubular member 20 in a conventional manner. The second and third chain engagement portions 44 and 54 are basically an annular plate-shaped elements with each having a plurality of chain engagement teeth defining an outer peripheral surface thereof, which are configured to mate with the drive chain C in a conventional manner. Thus, the second inner end portion 42 is disposed at the radially inner periphery of the second main body 40, while the second chain engagement portion 44 is disposed at the radially outer periphery of the second main body 40. Similarly, the third inner end portion 52 is disposed at the radially inner periphery of the third main body 50, while the third chain engagement portion 54 is disposed at the radially outer periphery of the third main body 50.

Referring now to FIGS. 2-5 and 9-12, the first second and third apertures 36, 46 and 56 will now be explained in more detail. The first second and third apertures 36, 46 and 56 have identical configurations and extend in a direction parallel to the hub rotation axis O. Thus, the first, second and third apertures 36, 46 and 56 are disposed at radial locations spaced radially outwardly of the first, second and third inner end portions 32, 42 and 52, respectively. Thus, when the reinforcement members 13 are received in the first, second and third apertures 36, 46 and 56, the reinforcement members 13 are disposed at radial locations spaced radially outwardly of the first, second and third inner end portions 32, 42 and 52, respectively.

Figures 3, 4, 5:
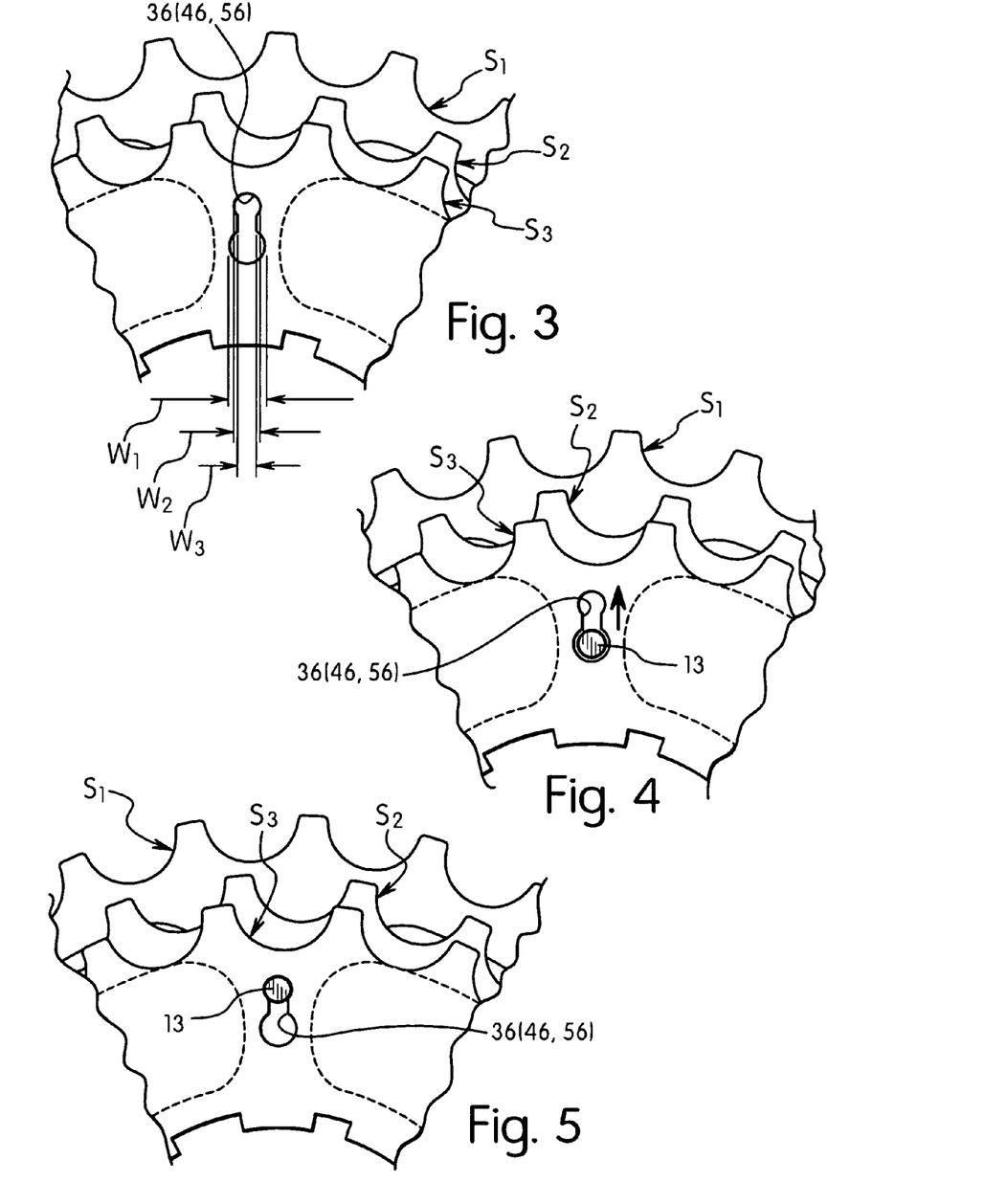
FIG. 3 is an enlarged, partial outside elevational view of the three largest sprockets of the rear sprocket assembly illustrated in FIGS. 1 and 2.
FIG. 4 is an enlarged, partial outside elevational view of the three largest sprockets of the rear sprocket assembly illustrated in FIGS. 1 and 2, with a reinforcement member partially installed in the apertures of the sprockets.
FIG. 5 is an enlarged, partial outside elevational view of the three largest sprockets of the rear sprocket assembly illustrated in FIGS. 1 and 2, with a reinforcement member fully installed in the apertures of the sprockets.

Each of the first second and third apertures 36, 46 and 56 includes a (first) insertion section 60, a (second) retaining section 62 and a (third) connection section 64 extending between the insertion section 60 and the retaining section 62. The first second and third apertures 36, 46 and 56 are configured and arranged such that the reinforcement members 13 can be inserted axially into the insertion sections 60, and slid through the connecting sections 64 into the retaining sections 62. The insertion sections 60 are located radially inwardly of the retaining sections 62. In this embodiment, the insertion sections 60 are aligned with their respective retaining sections 62 as viewed in a radial direction along each aperture 36, 46 and 56.

Specifically, each insertion section 60 has a substantially circular configuration in the illustrated embodiment, except where the connecting section 64 extends therefrom, with a transverse width $W_1$. The transverse width $W_1$ is slightly larger than a maximum transverse dimension $D_1$ of the reinforcement members 13, as explained below. Each retaining section 62 also has a substantially circular configuration in the illustrated embodiment, except where the connecting section 64 extends therefrom, with a transverse width $W_2$. The transverse width $W_2$ is slightly larger than a minimum transverse dimension $D_2$ of the reinforcement members 13 and smaller than the maximum transverse dimension $D_1$ of the reinforcement members 13, as explained below.

Each connecting section 64 has a rectangularly shaped slot configuration with a transverse width $W_3$. The transverse width $W_3$ is smaller than the minimum transverse dimension $D_2$ of the reinforcement members 13 in order to retain the reinforcement members 13 in the retaining sections 62, as explained below. In particular, the transverse width $W_3$ is smaller than the transverse width $W_2$ to form a pair of projecting abutment elements 66, which retain the reinforcement members 13 in the retaining sections 62, as explained below. The transverse widths $W_1$, $W_2$ and $W_3$ are preferably measured in directions perpendicular to the connecting sections 64 as seen in FIG. 3, although the transverse widths $W_1$ and $W_2$ can also be measured in other directions due to the circular configurations of the insertions sections 60 and the retaining sections 62.

Figure 6:
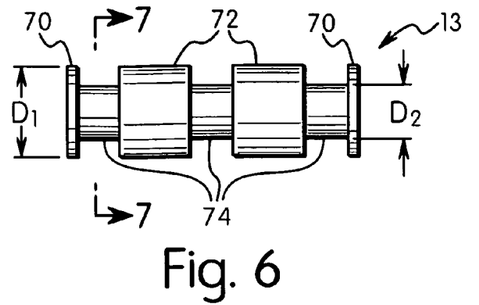
FIG. 6 is an enlarged, side elevational view of the reinforcement member illustrated in FIGS. 3-5.
Figure 7:
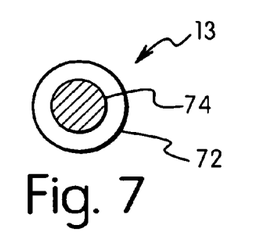
FIG. 7 is a cross-sectional view of the reinforcement member illustrated in FIG. 6, as seen along section line 7-7 of FIG. 6.
Figure 8:
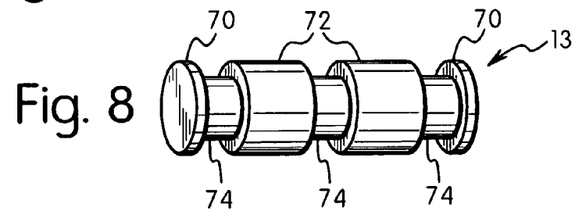
FIG. 8 is a perspective view of the reinforcement member illustrated in FIGS. 6 and 7.
Figure 9:
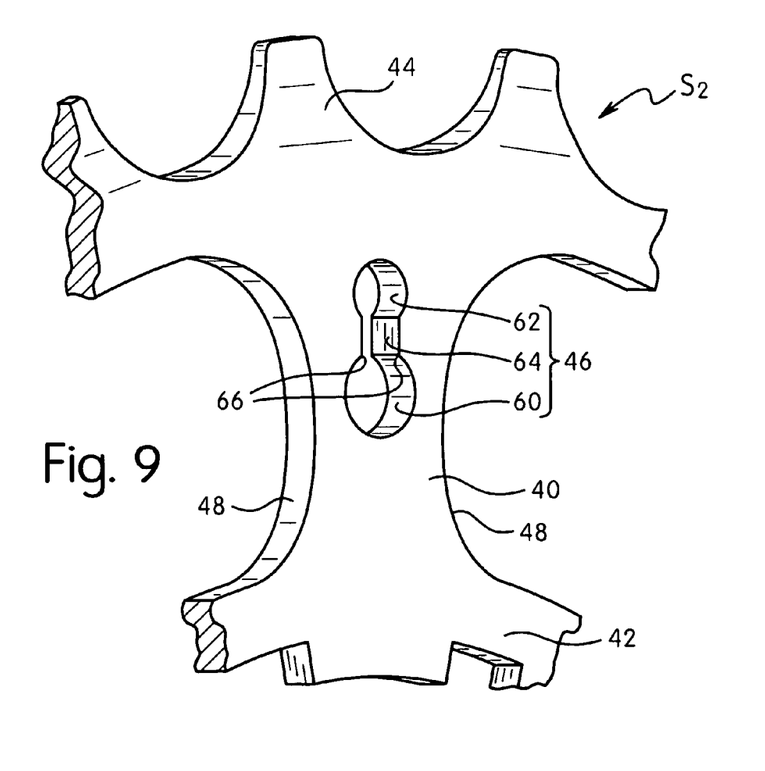
FIG. 9 is an enlarged, perspective view of a portion of the second largest sprocket illustrated in FIGS. 3-5.

Referring now to FIGS. 2-8, the reinforcement members 13 will now be explained in more detail. The reinforcement members 13 are identical. Thus, only one reinforcement member 13 will be explained and/or illustrated in detail herein. Each reinforcement member 13 is preferably a stepped, solid (non-hollow) member that includes a pair of end abutment portions 70, a pair of additional inner abutment portions 72 and three sprocket support (receiving) portions 74 arranged between the abutments 70 and 72 in an alternating manner, as best seen in FIGS. 6 and 8. The end abutment portions 70, the inner abutment portions 72 and the sprocket support portions 74 are preferably integrally formed together as a one-piece, unitary member using conventional manufacturing techniques that are well known in the bicycle art. Specifically, each reinforcement member 13 is preferably constructed of a light weight, rigid material such as a conventional metallic material using conventional manufacturing techniques (e.g., casting, machining or the like) in a conventional manner.

In the illustrated embodiment, each portion 70, 72 and 74 preferably has a substantially circular cross-sectional shape. In any case, the abutment portions 70 and 72 should have a cross-sectional shape substantially identical the shape of the insertion sections 60, and a size slightly smaller than the insertion sections 60 such the abutment portions 70 and 72 can slide axially into/through the insertions sections 60. Similarly, the sprocket support portions 74 should have a cross-sectional shape substantially identical the shapes of the retaining sections 62, and a size slightly smaller than the retaining sections 62 such the sprocket support portions 74 can be received in the retaining sections 62 in a relatively tight manner (i.e., the sprocket support portions 74 should mate with the retaining sections 62). The inner abutment portions 72 preferably have axial thicknesses corresponding to the axial thicknesses of the spacers $T_1$ and $T_2$, respectively. On the other hand, the end abutment portions 70 preferably have axial thicknesses substantially smaller than the inner abutment portions 72.

Referring again to FIGS. 2-12, mounting of the reinforcement members 13 in the first second and third apertures 36, 46 and 56 will now be explained in more detail. In order to attach the first, second and third sprockets $S_1$, $S_2$ and $S_3$ together, the reinforcement members 13 are inserted into/through the insertions sections 60 of the first second and third apertures 36, 46 and 56 such that one of the inner abutments 72 is disposed between the first and second sprockets $S_1$ and $S_2$ and the other of the inner abutments 72 is disposed between the second and third sprockets $S_2$ and $S_3$.

Then, the reinforcement members 13 are moved radially outwardly (i.e., by sliding movement generally perpendicular to the rotation axis O) through the connecting sections 64 into the retaining sections 62. The protruding abutment elements 66 are elastically deformed when the sprocket support portions 74 of the reinforcement members move therethrough such that the sprocket support portions 74 are substantially snap-fitted into the retaining sections. The abutment portions 70 and 72 of the reinforcement members will contact the axially facing sides of the sprockets $S_1$, $S_2$ and $S_3$. In other words, the axial length of the sprocket support portions 74 are substantially identical to the axial thickness of the first, second and third sprockets $S_1$, $S_2$ and $S_3$.

Due to the arrangements of the first second and third apertures 36, 46 and 56 of the first, second and third sprockets $S_1$, $S_2$ and $S_3$, respectively, and due to the arrangement of the reinforcement members 13, the reinforcement members 13 are retained with the first, second and third sprockets $S_1$, $S_2$ and $S_3$ during normal use (i.e., once mounted in the retaining sections 62). Thus, once fully installed, the reinforcement members 13 will not normally be released during normal use. However, the reinforcement members 13 are removeable and reinstallable without damaging the pin or the first, second and third sprockets $S_1$, $S_2$ and $S_3$ due to the configuration of the present invention. Thus the reinforcement members 13 are preferably non-threadedly coupled (i.e., attached without a threaded connection therebetween) to the first, second and third sprockets $S_1$, $S_2$ and $S_3$. Also, the connections between the reinforcement members 13 and the first, second and third sprockets $S_1$, $S_2$ and $S_3$ are preferably non-rivet connections (i.e., the reinforcement members 13 are not plastically deformed during installation). Rather, the first, second and third sprockets $S_1$, $S_2$ and $S_3$ slightly deform elastically during installation of the reinforcement members 13.

Second Embodiment

Referring now to FIGS. 13-16, a modified rear bicycle hub 211 having a modified rear sprocket assembly 212 with modified first, second and third sprockets $2S_1$, $2S_2$ and $2S_3$ in accordance with a second embodiment will now be explained. The rear hub 211 of this second embodiment is identical to the rear hub 11 of the first embodiment, except for the sprocket assembly 212. The modified rear sprocket assembly 212 of this second embodiment is identical to the sprocket assembly 12 of the first embodiment, except the rear sprocket assembly 212 includes the modified first, second and third sprockets $2S_1$, $2S_2$ and $2S_3$. The modified first, second and third sprockets $2S_1$, $2S_2$ and $2S_3$ are designed to be attached together using the reinforcement members 13 discussed and illustrated in the first embodiment.

In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity. However, it will be apparent to those skilled in the bicycle art from this disclosure that the descriptions and illustrations of the first embodiment also apply to this second embodiment, except as explained and/or illustrated herein. Parts of this second embodiment that are functionally identical to parts of the first embodiment will be given the same reference characters/numbers but 2/200 added thereto.

The modified first, second and third sprockets $2S_1$, $2S_2$ and $2S_3$ are designed to be mounted on the freewheel FW of the rear bicycle hub 211 in a manner identical to the first, second and third sprockets $S_1$, $S_2$ and $S_3$ of the first embodiment to form the modified rear sprocket assembly 212 in accordance with this second embodiment of the present invention. The first, second and third sprockets $2S_1$, $2S_2$ and $2S_3$ of this second embodiment are identical to the first, second and third sprockets $S_1$, $S_2$ and $S_3$ of the first embodiment, except the first, second and third sprockets $2S_1$, $2S_2$ and $2S_3$ of this second embodiment include modified first second and third apertures 236, 246 and 256, respectively.

Figures 14, 15, 16:
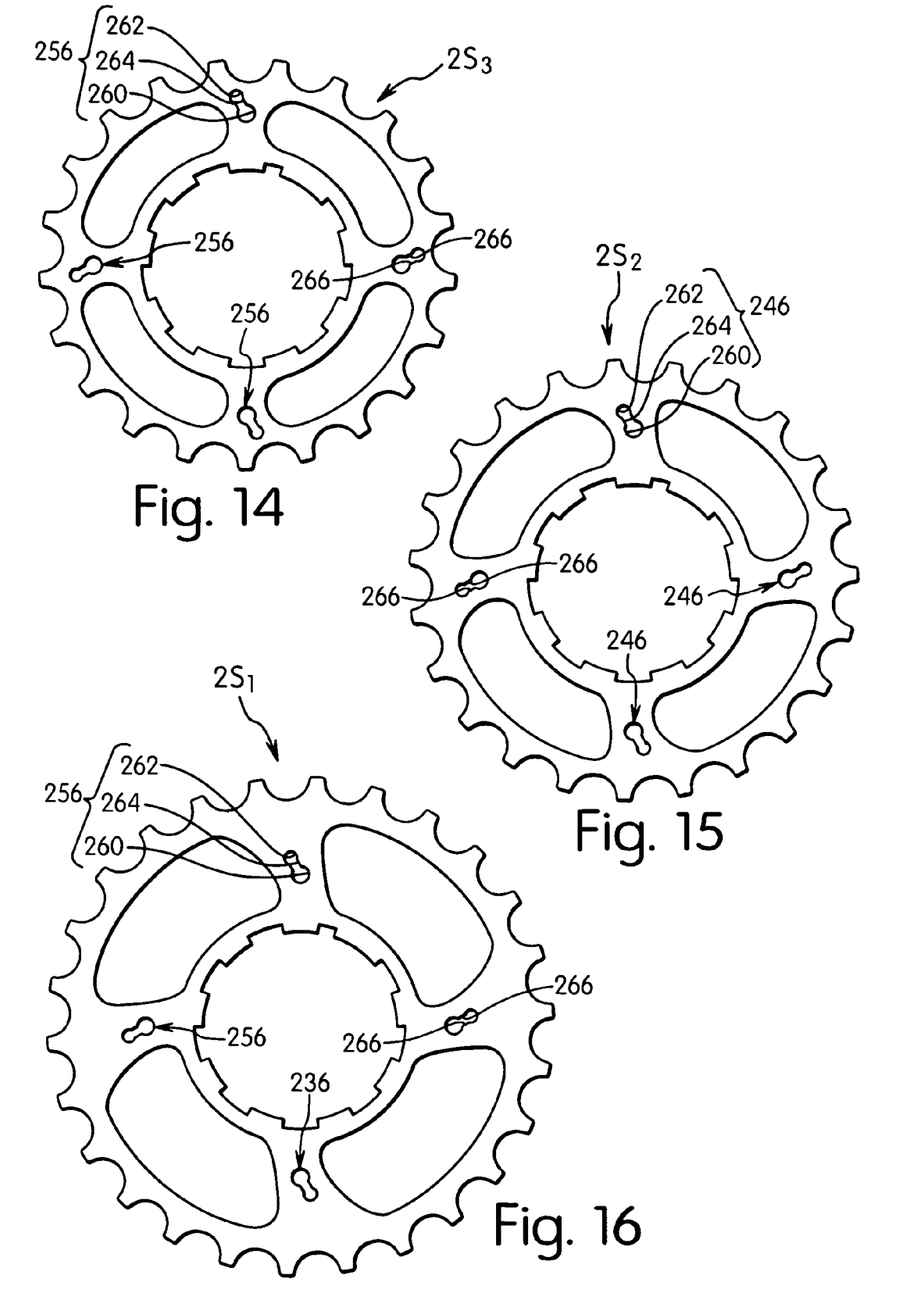
FIG. 14 is a side elevational view of the third largest sprocket of the sprocket assembly illustrated in FIG. 13.
FIG. 15 is a side elevational view of the second largest sprocket of the sprocket assembly illustrated in FIG. 13.
FIG. 16 is a side elevational view of the largest sprocket of the sprocket assembly illustrated in FIG. 13.
Figure 17:
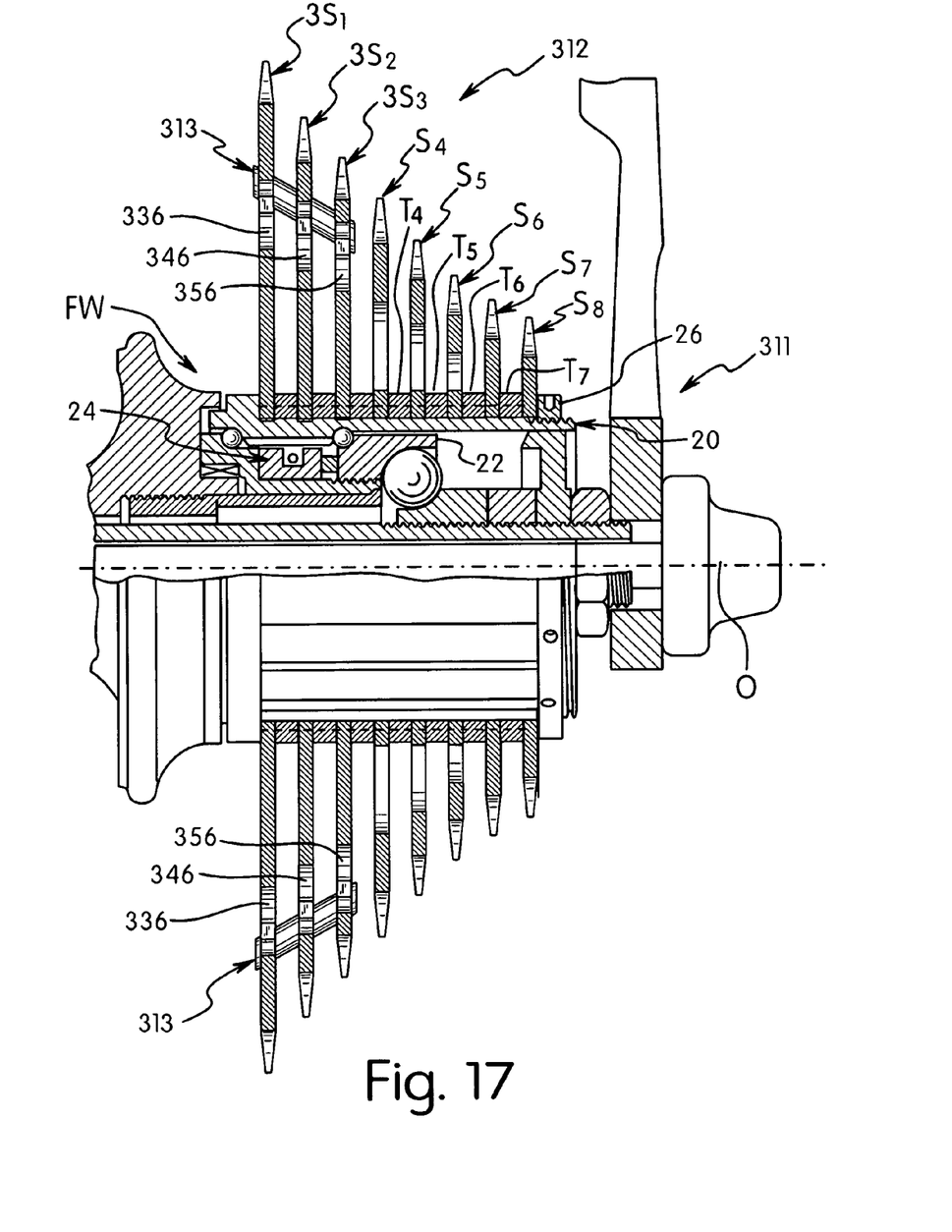
FIG. 17 is an enlarged, cross-sectional view of the rear hub illustrated in FIGS. 1-2 but with a sprocket assembly mounted thereon in accordance with a third embodiment of the present invention.

The first, second and third apertures 236, 246 and 256 are identical to the first, second and third apertures 36, 46 and 56 of the first, second and third sprockets $S_1$, $S_2$ and $S_3$ of the first embodiment, except the first, second and third apertures 236, 246 and 256 are slanted relative to a radial direction. Thus, each of the first, second and third apertures 236, 246 and 256 includes a (first) insertion section 260, a (second) retaining section 262, a (third) connecting section 264 and a pair of protruding abutment elements 266 substantially identical to the corresponding parts of the first, second and third apertures 36, 46 and 56, except for the orientations of the insertion sections 260, the retaining sections 262, the connecting sections 264 and the protruding abutment elements 266. Also, the first, second and third apertures 236, 246 and 256 are aligned each other as viewed in an axial direction like in the first embodiment. Thus, the first, second and third apertures 236, 246 and 256 receive the reinforcement members 13 in a manner substantially identical to the first embodiment. In particular, in this embodiment, the insertion sections 260 are circumferentially offset from their respective retaining sections 262 as viewed in a radial direction such that the connecting sections 264 are inclined/slanted relative to the radial direction. Thus, the reinforcement members 13 are slid along this inclined orientation during assembly, which is still perpendicular to the rotation axis O.

Third Embodiment

Referring now to FIGS. 17-24, a modified rear bicycle hub 311 having a modified rear sprocket assembly 312 with modified first, second and third sprockets $3S_1$, $3S_2$ and $3S_3$ attached to each other with modified reinforcement members 313 in accordance with a third embodiment will now be explained. The rear hub 311 of this third embodiment is identical to the rear hub 11 of the first embodiment, except for the sprocket assembly 312. The modified rear sprocket assembly 312 of this third embodiment is identical to the sprocket assembly 12 of the first embodiment, except the rear sprocket assembly 312 includes the modified first, second and third sprockets $3S_1$, $3S_2$ and $3S_3$ attached to each other with the modified reinforcement members 313.

In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. However, it will be apparent to those skilled in the bicycle art from this disclosure that the descriptions and illustrations of the first embodiment also apply to this third embodiment, except as explained and/or illustrated herein. Parts of this third embodiment that are functionally identical to parts of the first embodiment will be given the same reference characters/numbers but 3/300 added thereto.

The modified first, second and third sprockets $3S_1$, $3S_2$ and $3S_3$ are designed to be mounted on the freewheel FW of the rear bicycle hub 311 in a manner identical to the first, second and third sprockets $S_1$, $S_2$ and $S_3$ of the first embodiment to form the modified rear sprocket assembly 312 in accordance with this third embodiment of the present invention. The first, second and third sprockets $3S_1$, $3S_2$ and $3S_3$ of this third embodiment are identical to the first, second and third sprockets $S_1$, $S_2$ and $S_3$ of the first embodiment, except the first, second and third sprockets $3S_1$, $3S_2$ and $3S_3$ of this third embodiment include modified first second and third apertures 336, 346 and 356, respectively.

Figures 18, 19, 20:
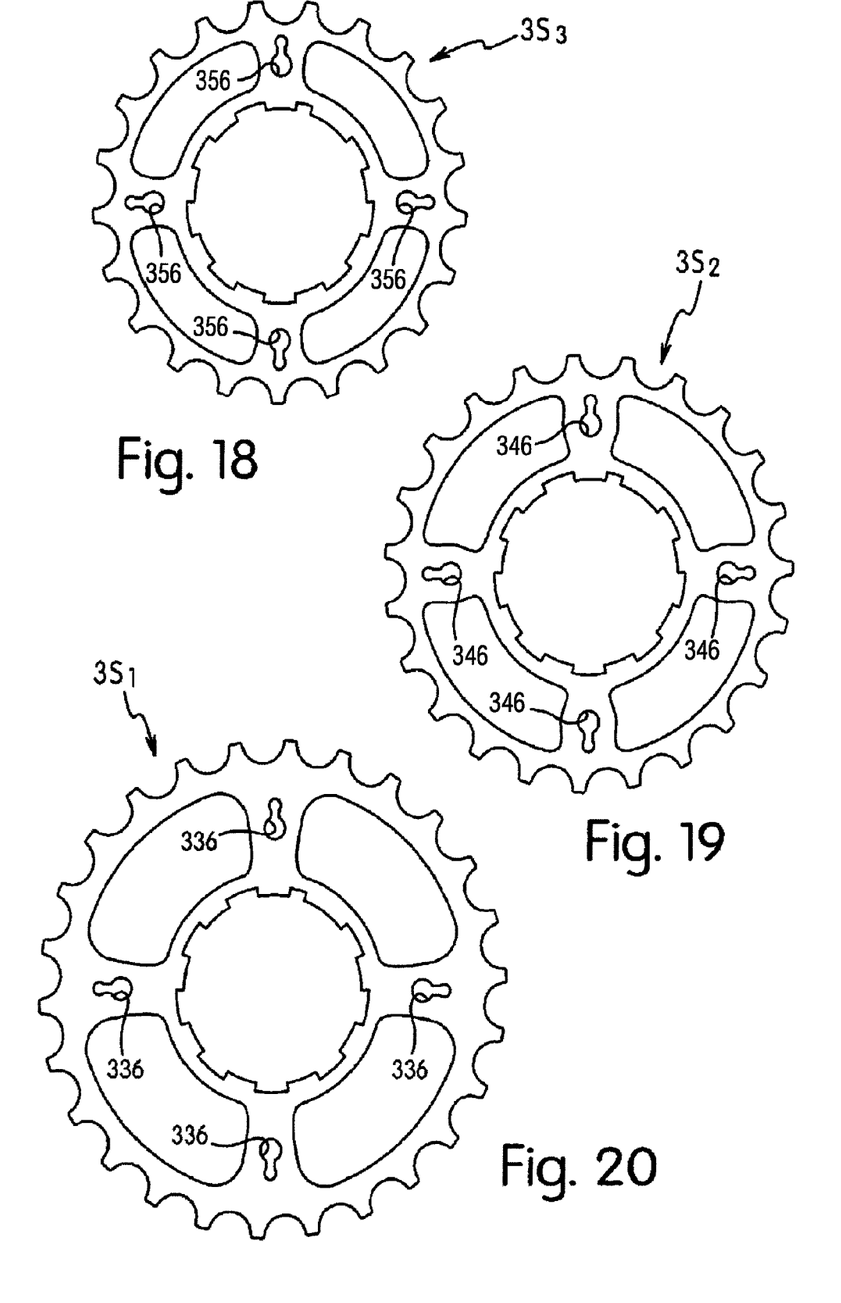
FIG. 18 is a side elevational view of the third largest sprocket of the sprocket assembly illustrated in FIG. 17.
FIG. 19 is a side elevational view of the second largest sprocket of the sprocket assembly illustrated in FIG. 17.
FIG. 20 is a side elevational view of the largest sprocket of the sprocket assembly illustrated in FIG. 17.

The first, second and third apertures 336, 346 and 356 are identical to the first, second and third apertures 36, 46 and 56 of the first, second and third sprockets $S_1$, $S_2$ and $S_3$ of the first embodiment, except for their positions and the first, second and third apertures 336, 346 and 356 include larger (first) insertion sections 360 than the insertion sections 60 of the first embodiment in order to accommodate the reinforcement members 313, which are mounted in an inclined manner relative to the rotation axis O. Thus, each of the first, second and third apertures 336, 346 and 356 includes a (first) insertion section 360, a (second) retaining section 362, a (third) connecting section 364 and a pair of protruding abutment elements 366 substantially identical to the corresponding parts of the first, second and third apertures 36, 46 and 56, except for their positions and the size of each insertion section 360.

In particular, the first, second and third apertures 336, 346 and 356 are not aligned with each other as viewed in an axial direction like in the first and second embodiments. Rather, the second apertures 346 are located radially further from the rotation axis O than the third apertures 356, and the first apertures 336 are located radially further from the rotation axis O than the second apertures 346. However, the first, second and third apertures 336, 346 and 356 receive the reinforcement members 313 in a manner very similar to the first embodiment. In particular, in this embodiment, the first, second and third apertures 336, 346 and 356 are radially offset such that the reinforcement members 313 are mounted in an inclined position relative to the rotation axis O as, best understood from FIG. 17. Similar to the first embodiment, the reinforcement members are inserted (on an incline) into/through the insertion sections 360, which are enlarged to accommodate the inclination of the reinforcement members 313. The reinforcement members 313 are then slid radially outwardly while remaining in this inclined orientation during assembly, which is still perpendicular to the rotation axis O.

Figure 21:
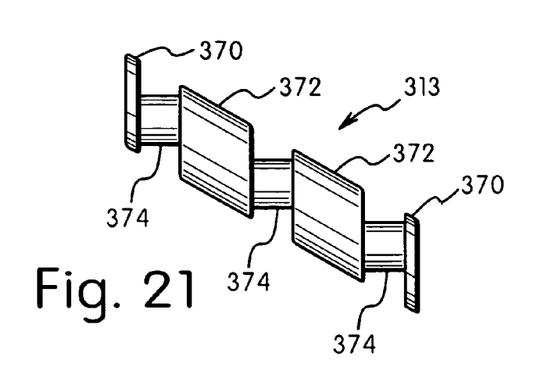
FIG. 21 is an enlarged, side elevational view of the reinforcement member illustrated in FIG. 17.
Figure 22:
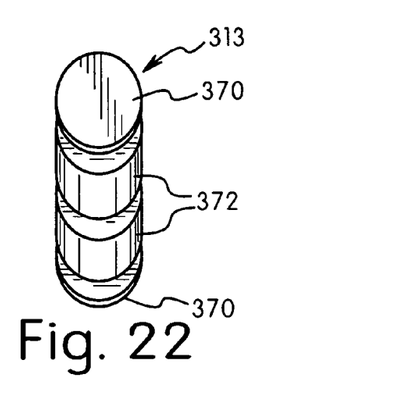
FIG. 22 is an end perspective view of the reinforcement member illustrated in FIG. 21.
Figure 23:
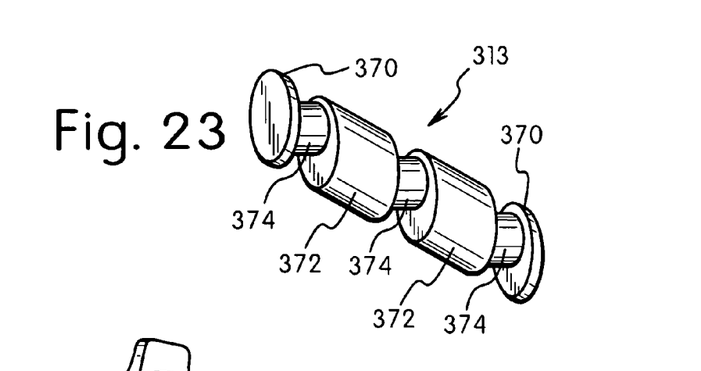
FIG. 23 is a side perspective view of the reinforcement member illustrated in FIGS. 21 and 22.
Figure 24:
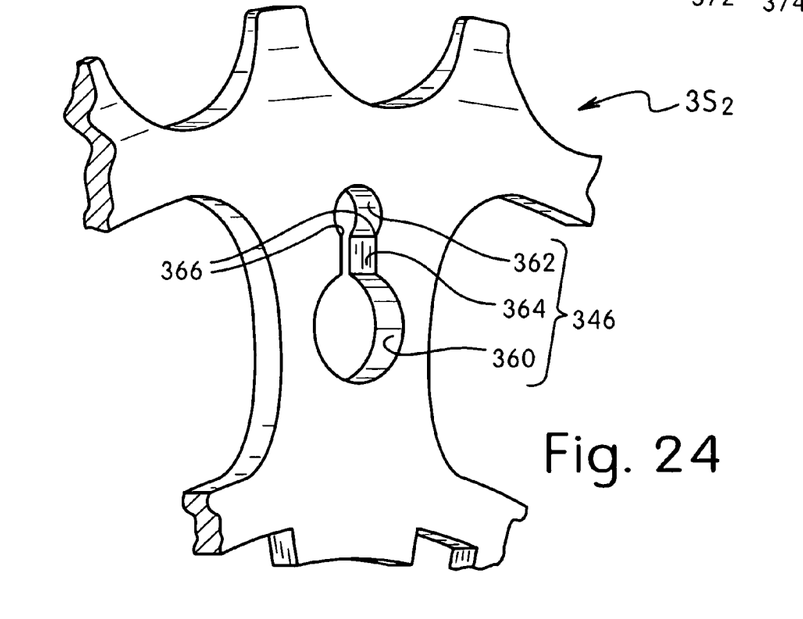
FIG. 24 is an enlarged, perspective view of a portion of the second largest sprocket illustrated in FIGS. 17 and 19.

The reinforcement members 313 are similar to the reinforcement members 13 of the first embodiment. The reinforcement members 313 are identical. Thus, only one reinforcement member 313 will be explained and/or illustrated in detail herein. Each reinforcement member 313 is a stepped member that includes a pair of end abutment portions 370, a pair of additional inner abutment portions 372 and three sprocket support (receiving) portions 374 arranged between the abutments 370 and 372 in an alternating manner, as best seen in FIGS. 21-23. The sprocket support portions 374 are identical to the sprocket support portions 74, except the sprocket support portions 374 are offset from each other to be retained in the radially offset retaining sections 362.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle sprocket assembly comprising:

a first sprocket including a first main body with a first inner end portion configured to be attached to a bicycle freewheel and a first outer chain engagement portion, the first sprocket having a first aperture located between the first inner end portion and the first outer chain engagement portion;

a second sprocket including a second main body with a second inner end portion configured to be attached to the bicycle freewheel and a second outer chain engagement portion, the second sprocket having a second aperture located between the second inner end portion and the second outer chain engagement portion, each of the first and second apertures having a first section, a second section and a connecting section extending between the first section and the second section, the connecting section having parallel surfaces spaced apart from one another by a first width that is smaller than respective diameters of the first and second sections;

a spacer disposed between the first and second sprockets at a radial location adjacent the first and second inner end portions; and at least one reinforcement member having at least two sprocket support portions, each sprocket support portion having a diameter larger than the first width of the connecting sections, the sprocket support portions causing the connecting sections to undergo elastic deformation as the sprocket support portions moves through the connecting portions between the first portions and second sections of the first and second apertures such that the at least one reinforcement member is releasably snap-fitted within the first and second apertures of the first and second sprockets.

2. The bicycle sprocket assembly according to claim 1, wherein the reinforcement member includes three abutment portions with two sprocket receiving portions arranged therebetween in an alternating manner, and the reinforcement member is installable in the first and second apertures by a sliding movement generally perpendicular to a rotation axis of the first and second sprockets.

3. The bicycle sprocket assembly according to claim 2, wherein the reinforcement member is a stepped member with the sprocket receiving portions having a transverse width smaller than the abutment portions.

4. The bicycle sprocket assembly according to claim 3, wherein the first sections of the first and second apertures have transverse widths that are larger than the abutment portions.

5. The bicycle sprocket assembly according to claim 1, wherein the first section of the first aperture is located radially inwardly relative to the second section of the first aperture; and the first section of the second aperture is located radially inwardly relative to the second section of the second aperture.

6. The bicycle sprocket assembly according to claim 1, wherein the first sections are aligned with the second sections as viewed in a radial direction.

7. The bicycle sprocket assembly according to claim 1, wherein
the first sections are circumferentially offset from the second sections as viewed in a radial direction.

8. The bicycle sprocket assembly according to claim 1, wherein
the first section of the first aperture is located radially outwardly relative to the first section of the second aperture and the second section of the first aperture is located radially outwardly relative to the second section of the second aperture such that the reinforcement member is inclined relative to a rotation axis of the first and second sprockets.

9. The bicycle sprocket assembly according to claim 1, further comprising
a third sprocket arranged adjacent one of the first and second sprockets with the reinforcement member coupled thereto.

10. The bicycle sprocket assembly according to claim 1, wherein
the first and second sprockets each include a splined radially inner peripheral surface configured for engagement with a bicycle hub.

11. A bicycle sprocket assembly comprising:
a first sprocket including a first main body with at least one first aperture and a first outer chain engagement portion;
a second sprocket including a second main body with at least one second aperture and a second outer chain engagement portion;
a third sprocket including a third main body with at least one third aperture and a third outer chain engagement portion; and
at least one reinforcement member disposed in the first, second and third apertures of the first, second and third sprockets respectively, the reinforcement member having three sprocket receiving portions each extending through a respective one of the first, second and third apertures of the first, second and third sprockets, each of the sprocket receiving portions having an outer surface with a uniform annular shape having a diameter,
each of the first, second and third apertures including a first section and a second section narrower than the first section to assemble the reinforcement member with the first, second and third sprockets, the reinforcement member being retained in the second sections when assembled, and
each of the first, second and third apertures further including a connecting section extending between the first section and the second section with respective ones of the sprocket receiving portions of the reinforcement member being moved through the connecting sections into the second sections and retained in the second sections, each of the connecting sections having a pair of parallel surfaces spaced apart from one another by a transverse width smaller than the diameter of the sprocket receiving portions of the reinforcement member such that movement of the sprocket receiving portions through the connecting sections causes the connecting sections to elastically deform releasably snap-fitting the sprocket receiving portions of the reinforcement member in the second sections, the transverse width of the connecting sections being smaller than a corresponding diameters of the first and second sections of respective ones of the first, second and third apertures.

12. The bicycle sprocket assembly according to claim 11, wherein
the reinforcement member includes three abutment portions with two sprocket receiving portions arranged therebetween in an alternating manner, and the reinforcement member is installable in the first and second apertures by a sliding movement generally perpendicular to a rotation axis of the first and second sprockets.

13. The bicycle sprocket assembly according to claim 12, wherein
the reinforcement member is a stepped member with the sprocket receiving portions having a transverse width smaller than the abutment portions.

14. The bicycle sprocket assembly according to claim 13, wherein
the first sections of the first and second apertures have transverse widths that are larger than the abutment portions.

15. The bicycle sprocket assembly according to claim 11, wherein
the first section of the first aperture is located radially inwardly relative to the second section of the first aperture; and
the first section of the second aperture is located radially inwardly relative to the second section of the second aperture.

16. The bicycle sprocket assembly according to claim 11, wherein
the first sections are aligned with the second sections as viewed in a radial direction.

17. The bicycle sprocket assembly according to claim 11, wherein the first sections are circumferentially offset from the second sections as viewed in a radial direction.

18. The bicycle sprocket assembly according to claim 11, wherein
the first section of the first aperture is located radially outwardly relative to the first section of the second aperture and the second section of the first aperture is located radially outwardly relative to the second section of the second aperture such that the reinforcement member is inclined relative to a rotation axis of the first and second sprockets.

19. A bicycle sprocket assembly comprising:
a first sprocket including a first main body with a first outer chain engagement portion and at least one first aperture;
a second sprocket including a second main body with a second outer chain engagement portion and at least one second aperture;
a third sprocket including a third main body with at least one third aperture and a third outer chain engagement portion; and
at least one reinforcement member disposed in the first, second and third apertures of the first, second and third sprockets, respectively, the reinforcement member having four abutment portions with three sprocket receiving portions arranged therebetween in an alternating manner, the reinforcement member being installable in the first, second and third apertures by a sliding movement generally perpendicular to a rotation axis of the first, second and third sprockets, the sprocket receiving portions having a uniform uninterrupted annular surface having a first diameter and the abutment portions having a second diameter greater than the first diameter,
each of the first, second and third apertures including a first section and a second section narrower than the first section with the reinforcement member being insertable into the first sections, the sprocket receiving portions being movable into the second sections and retained in the second sections, and each of the first, second and third apertures further including a connecting section having parallel surfaces spaced apart from one another that extend between the first section and the second section, the connecting section having a transverse width that is smaller than respective diameters of the first and second sections and smaller than the second diameter of the sprocket receiving portions of the reinforcement member such that with the sprocket receiving portions of the reinforcement member moving through the connecting sections from the first sections into the second sections, connecting sections are elastically deformed such that the at least one reinforcement member is snap-fitted to the first, second and third apertures retaining the sprocket receiving portions in the second sections.

20. The bicycle sprocket assembly according to claim 19, wherein
the first sections of the first and second apertures have transverse widths that are larger than the abutment portions.

21. The bicycle sprocket assembly according to claim 19, wherein
the first section of the first aperture is located radially inwardly relative to the second section of the first aperture; and
the first section of the second aperture is located radially inwardly relative to the second section of the second aperture.

22. The bicycle sprocket assembly according to claim 19, wherein
the first sections are aligned with the second sections as viewed in a radial direction.

23. The bicycle sprocket assembly according to claim 19, wherein
the first sections are circumferentially offset from the second sections as viewed in a radial direction.

24. The bicycle sprocket assembly according to claim 19, wherein
the first section of the first aperture is located radially outwardly relative to the first section of the second aperture and the second section of the first aperture is located radially outwardly relative to the second section of the second aperture such that the reinforcement member is inclined relative to the rotation axis of the first and second sprockets.

* * * * *